United States Patent
Harris

[19]

[11] Patent Number: 6,004,461
[45] Date of Patent: *Dec. 21, 1999

[54] DIVIDED PHASE SEPARATOR

[76] Inventor: Ronald B. Harris, 28109 Charlie Watts Rd., Livingston, La. 70754

[*] Notice: This patent is subject to a terminal disclaimer.

[21] Appl. No.: 09/113,217

[22] Filed: Jul. 10, 1998

Related U.S. Application Data

[63] Continuation-in-part of application No. PCT/US97/00384, Jan. 10, 1997, which is a continuation-in-part of application No. 08/703,960, Aug. 28, 1996, Pat. No. 5,707,535, and a continuation-in-part of application No. 08/584,555, Jan. 11, 1996, Pat. No. 5,589,081.

[51] Int. Cl.$^6$ .................................................. B01D 24/00
[52] U.S. Cl. ....................... 210/241; 210/416.1; 210/455; 210/484; 210/499
[58] Field of Search .................................... 210/767, 804, 210/241, 416.1, 455, 477, 484, 485, 499, 513

[56] References Cited

U.S. PATENT DOCUMENTS

| | | | |
|---|---|---|---|
| 1,311,639 | 7/1919 | Cartwright . | |
| 2,461,814 | 2/1949 | Fisher | 210/52 |
| 2,649,965 | 8/1953 | King et al. | 210/149 |
| 3,631,987 | 1/1972 | Cattano | 210/452 |
| 4,046,689 | 9/1977 | Argyll | 210/59 |
| 4,200,535 | 4/1980 | Kennedy, Jr. | 210/241 |
| 4,366,052 | 12/1982 | Cloutier | 210/199 |
| 4,377,475 | 3/1983 | Wiedemann | 210/136 |
| 4,436,622 | 3/1984 | Petretti | 210/232 |
| 4,655,916 | 4/1987 | Schlesiger | 210/173 |
| 4,807,373 | 2/1989 | Sloan et al. | 37/63 |
| 4,854,058 | 8/1989 | Sloan et al. | 37/63 |
| 4,871,454 | 10/1989 | Lott | 210/205 |
| 4,929,353 | 5/1990 | Harris | 210/237 |
| 5,405,539 | 4/1995 | Schneider | 210/747 |
| 5,595,654 | 1/1997 | Caughman, Jr. | 210/323.1 |
| 5,670,039 | 9/1997 | Harris | 210/138 |

FOREIGN PATENT DOCUMENTS 56-76217 of 0000 Japan .

*Primary Examiner*—Christopher Upton
*Attorney, Agent, or Firm*—Roy, Kiesel & Tucker

[57] ABSTRACT

A portable liquid-solid separator tank having a bed with a drain, surrounding sides and a dividing wall. A grate overlays the interior of the vessel, bed, and sides, and forms the dividing wall. A filter overlays the grate, extending up the sides and covering the top and the dividing wall. The separator, which may be vacuum loadable, is filled with a sludge which is then separated from the liquid it contains by gravity and hydrostatic pressure which force the liquid through the filter. Liquid is drained out of the bottom of the vessel and the solids are transported within the vessel. The solids are removed through a gate that may be provided in the tank, or by using a hydraulic lift system in much the same manner as a garbage truck empties a municipal dumpster. The filter is removed with the solids and usually discarded.

31 Claims, 6 Drawing Sheets

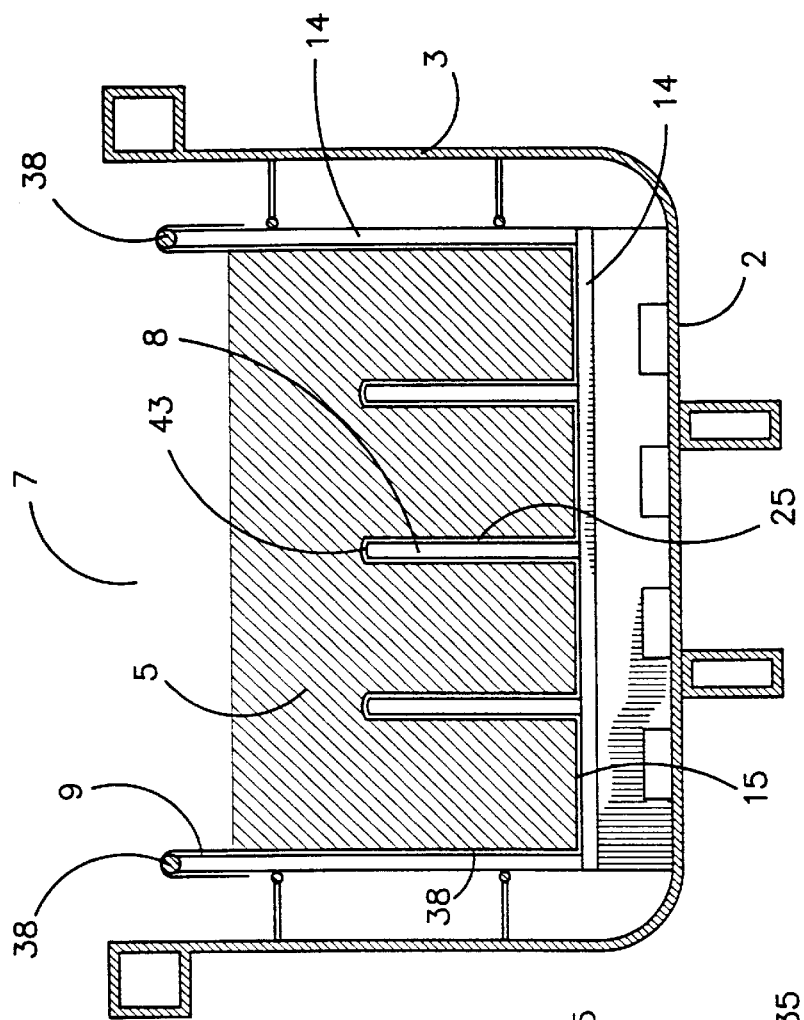
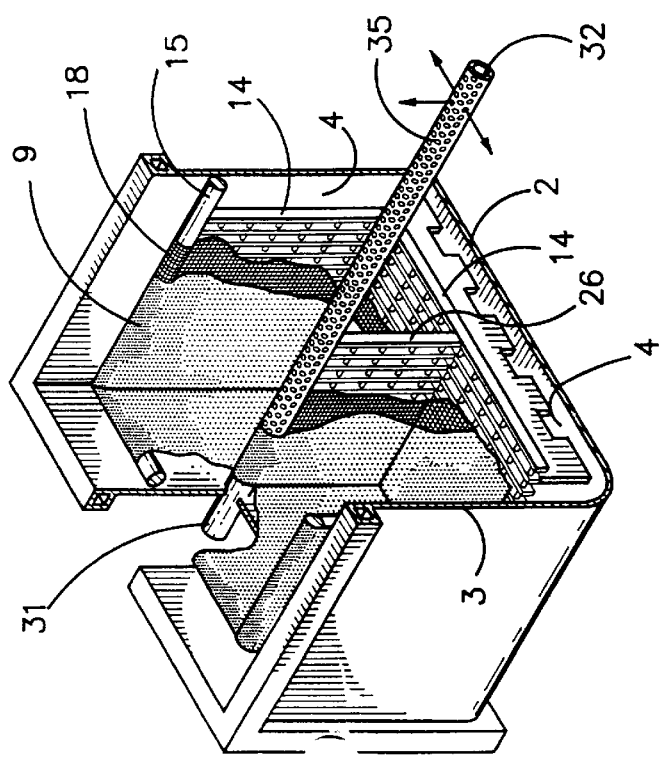

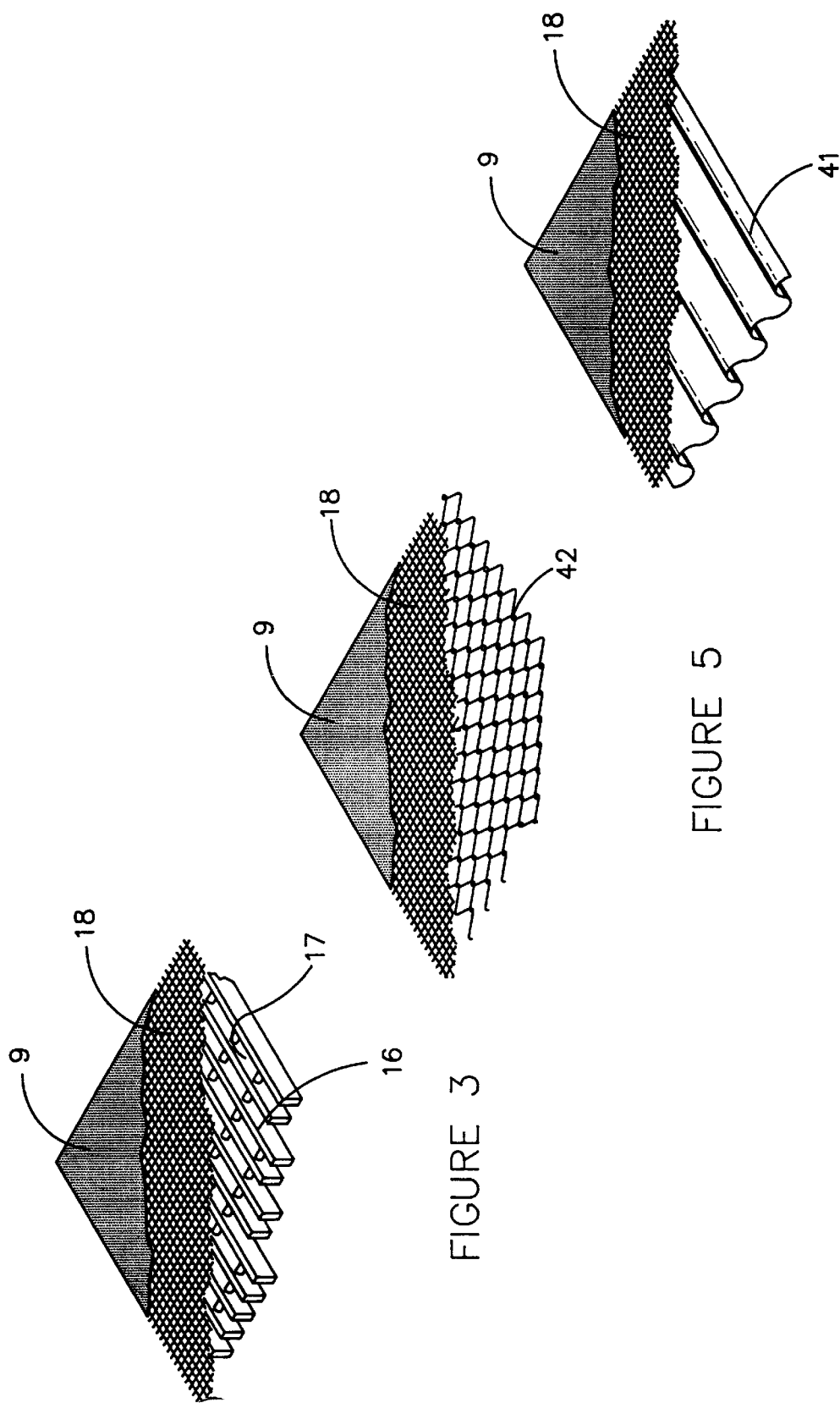

DIVIDED PHASE SEPARATOR

This application is a continuation-in-part of PCT/US97/00384, filed Jan. 10, 1997, which is a continuation-in-part of U.S. patent application Ser. No. 08/703,960, filed Aug. 28, 1996, now U.S. Pat. No. 5,707,535, and U.S. patent application Ser. No. 08/584,555, filed Jan. 11, 1996, now U.S. Pat. No. 5,589,081, all of which are hereby incorporated by reference in their entirety.

BACKGROUND OF THE INVENTION

1. Field of the Invention

This invention relates generally to liquid-solid separators and particularly to portable separators employing a combination of filtration and capillary action for treatment of sludge in bulk.

2. Prior Art

The object of liquid solid separators is to remove the liquid from solids in a sludge. This is desirable for several reasons. First, certain environmental regulations require the water content of solid waste to be below specified levels before it may be accepted in a landfill. Second, such waste must frequently be hauled to the treatment or disposal site, and the freight carriers, as well as the disposal site, often charge by the pound. Finally, in many industrial processes, the finished product will be either a solid or a liquid contained in a sludge, and it will be necessary to separate the solid from the liquid phase in order to isolate the finished product.

One such separator is disclosed in U.S. Pat. No. 4,929,353 by Harris. Harris discloses a phase separator that comprises a tank having a bed and surrounding sides. A grating is supported over the bed and walls leaving a space between the grating and the wall and the bed below. A screen is attached to the grating. A filter is then laid over the screen and grating, and sludge is deposited in the tank on top of the filter. The liquid in the sludge will move through the filter. In Harris, movement from the sludge to the filter is accomplished by gravity, hydrostatic pressure and by wicking, or capillary action. After passing through the filter, the liquid will collect in the space between the bed and the grating. A drain is provided to allow such liquid to be released from the tank. A shortcoming in such a separator is that with many types of sludge, the center portion of the tank either will not dry completely or takes an excessively long time to dry. This results in increased freight charges, lengthy drying times and, occasionally, rejection by landfills.

Another problem faced by those attempting to remove liquids from sludge is "blinding." One cause of blinding is when the liquids pass through the filter rapidly. When this occurs, the finer solids are carried with the liquid to the filter where the solids are deposited. As the solids are deposited, they coat the filter and can substantially inhibit further drainage through the filter.

OBJECTS OF THE INVENTION

Therefore, one object of this invention is to provide a tank which will affect liquid-solid separation.

Another object of this invention is to provide a separator which reduces the amount of liquid the sludge mass will retain at its center.

Another object of this invention is to provide a separator with increased surface area and a shorter pathway to free flow space.

Another object of this invention is to provide a separator which allows for collection of the liquid phase.

Another object of this invention is to provide a separator which can be used for hazardous waste.

Another object of this invention is to provide a separator which is vacuum loadable.

Another object of this invention is to provide a separator which can be transported without additional handling of the retained solids.

Another object of the invention is to provide a separator from which the retained solids may be easily unloaded.

Another object of this invention is to provide a separator which can be used for sludge containing fines and particulate matter.

Still another object of this invention is to offset or reduce the effects of "blinding" in the separation process.

Other objects and advantages of this invention shall become apparent from the ensuing description.

SUMMARY OF THE INVENTION

A portable liquid solid separator is provided. The separator consists of a tank having walls and a floor. In one embodiment, the tank resembles a large rectangular municipal garbage dumpster. One of the walls is hinged so that it can function as a door. The door will, of course, be equipped with a watertight seal to prevent leaks.

The inside of the tank is covered with a heavy metal grating. There is a space between the grating and the walls and the grating and the bed of the tank. There is also one or more dividing walls composed of grating that protrude vertically from the grating covering the bed of the tank.

All grating surfaces—those overlaying the walls and the bed as well as those forming the dividing wall—will be covered by a screen. In a preferred embodiment, all edges of the screen exposed to the interior of the tank should be smooth. Also, the top edge of each dividing wall should be smooth and continuous. If there are exposed rough edges or corners in the screen or the dividing wall, the filter may catch on such edges. If the filter becomes caught, it may tear when weight is placed on it, or it may pull the screen loose when the filter and retained solids are removed. By making all exposed edges smooth, the potential for tearing the filter or screen will be substantially reduced.

Sludge that is to be treated is deposited in the tank over the filter. The screen will distribute the weight of the sludge on the grating so that the filter will not sag down into the spaces in the grating and become lodged or possibly torn. If the openings in the grating are small enough, a screen may not be needed to keep the filter from sagging into the grating openings.

Gravity and hydrostatic pressure will force the liquid through the filter from the sludge to the space between the wall and the grating or onto the grating itself. The liquid will flow down the outside of the filter or down the grating until it collects in the space between the grating and the bed of the tank. A drain is located there which will allow liquid to be removed.

The dividing wall allows liquid in the central portion of the tank to drain more thoroughly and more quickly. Without the dividing wall, liquid in the central portion of the tank must travel the greater distance to the filter and grating covering the bed or walls in order to drain. By adding one or more dividing walls, the distance liquids in the center of the tank must travel to reach a drainage surface can be substantially reduced while the total surface area available for drainage is simultaneously increased. By adding the dividing wall or walls, these goals of increased drainage surface area and decreasing the distance fluid must travel are accomplished without substantially altering the volume capacity of the tank, or the method of removing the solids.

Additionally, a pipe along the top of the dividing wall may be attached to a compressed air source and perforated with air holes. In this way, air may be pumped into the center of the tank, further enhancing drying.

When the sludge is dry, the whole unit may be loaded onto a truck or other transporter and hauled to the desired location. There, the filter and all remaining solids can be removed, leaving the tank ready to be used again.

DESCRIPTION OF THE FIGURES

FIG. 2 is a cross-sectional view of a preferred embodiment of the dividing walls extending vertically from the bed of the separation tank.

FIG. 3 is a cut-away, perspective view of the grating and screening used to cover the walls, the bed and the dividing wall of the separation tank.

FIG. 4 is a cut-away, perspective view of the interior of the separation tank at the end opposite the door shown in FIG. 1 which better illustrates the introduction of compressed gas into the interior of the separation tank via the air holes in the pipe.

FIG. 5 is a cut-away, perspective view of the fencing and screening used to cover the walls, the bed and the dividing wall of the separation tank.

FIG. 6 is a cut-away, perspective view of the corrugated sheets and screening used to cover the walls, the bed and the dividing wall of the separation tank.

DETAILED DESCRIPTION OF THE INVENTION

Figure 1:
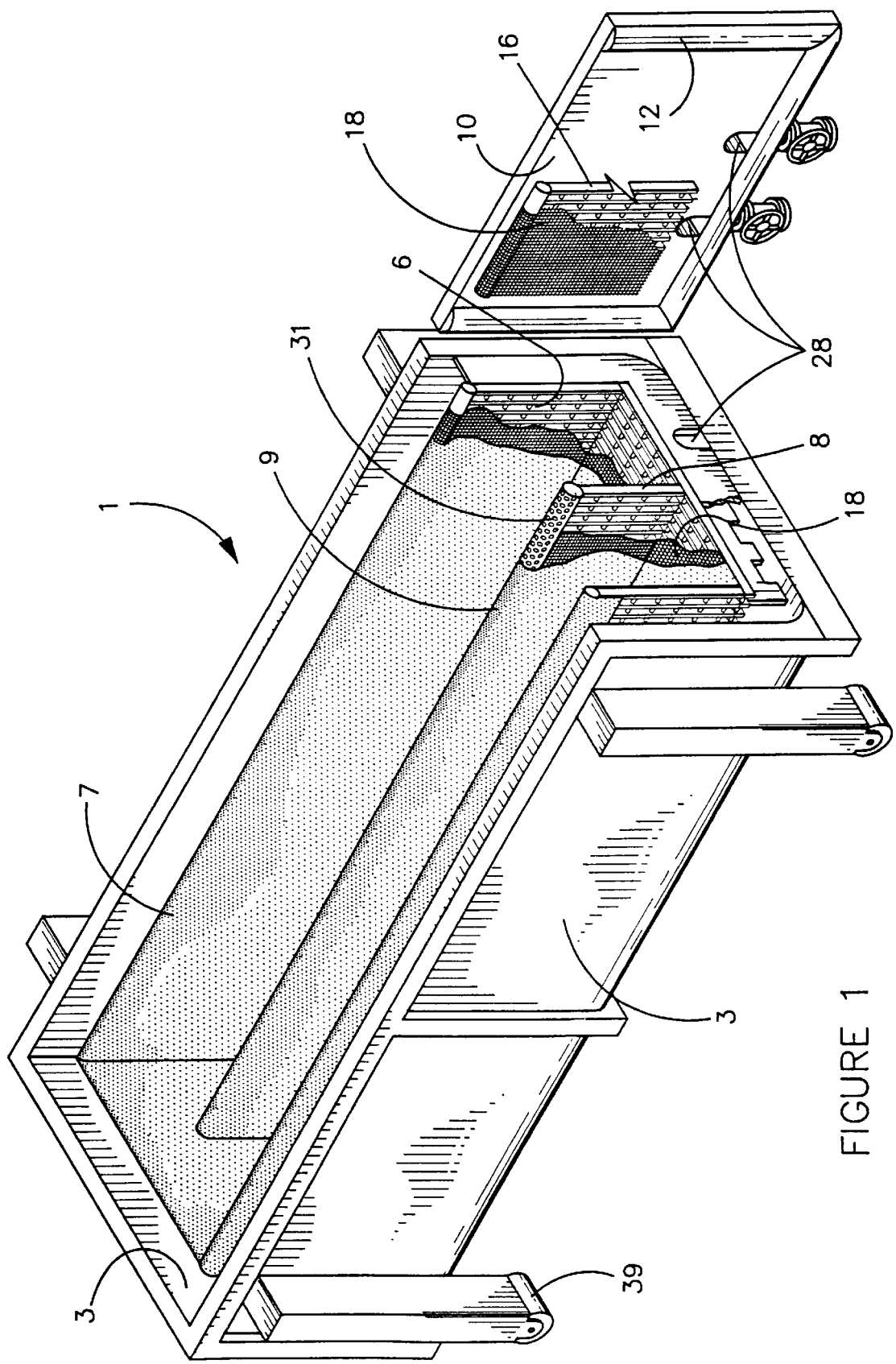
FIG. 1 is a cut-away perspective view of a preferred embodiment of the separation tank where the target solids opening is a hinged rear gate wall swung open to better illustrate the interior of the separation tank.
Figure 7:
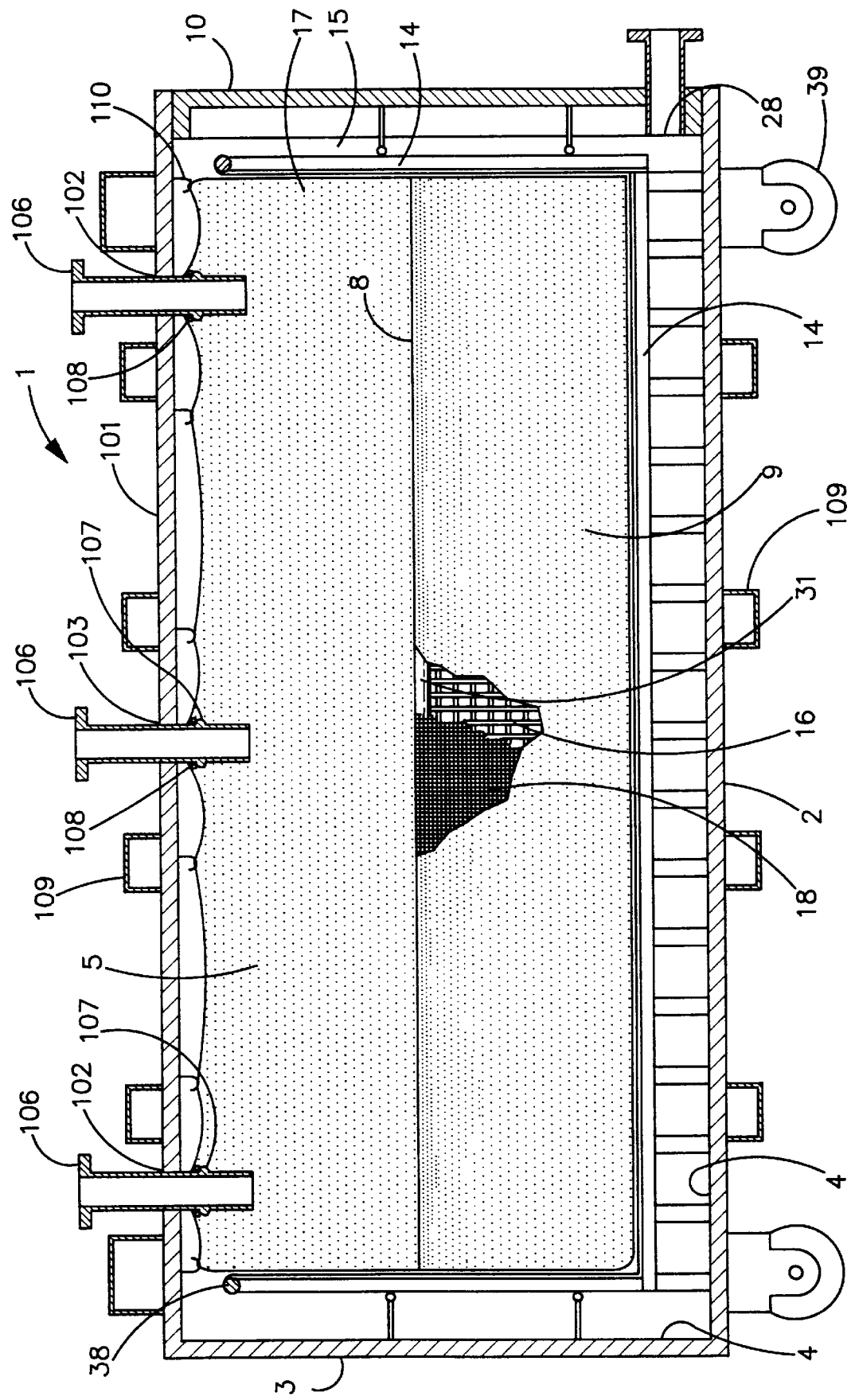
FIG. 7 is a cross-sectional view of a preferred embodiment of a vacuum loadable separator with the filter in place.
Figure 8:
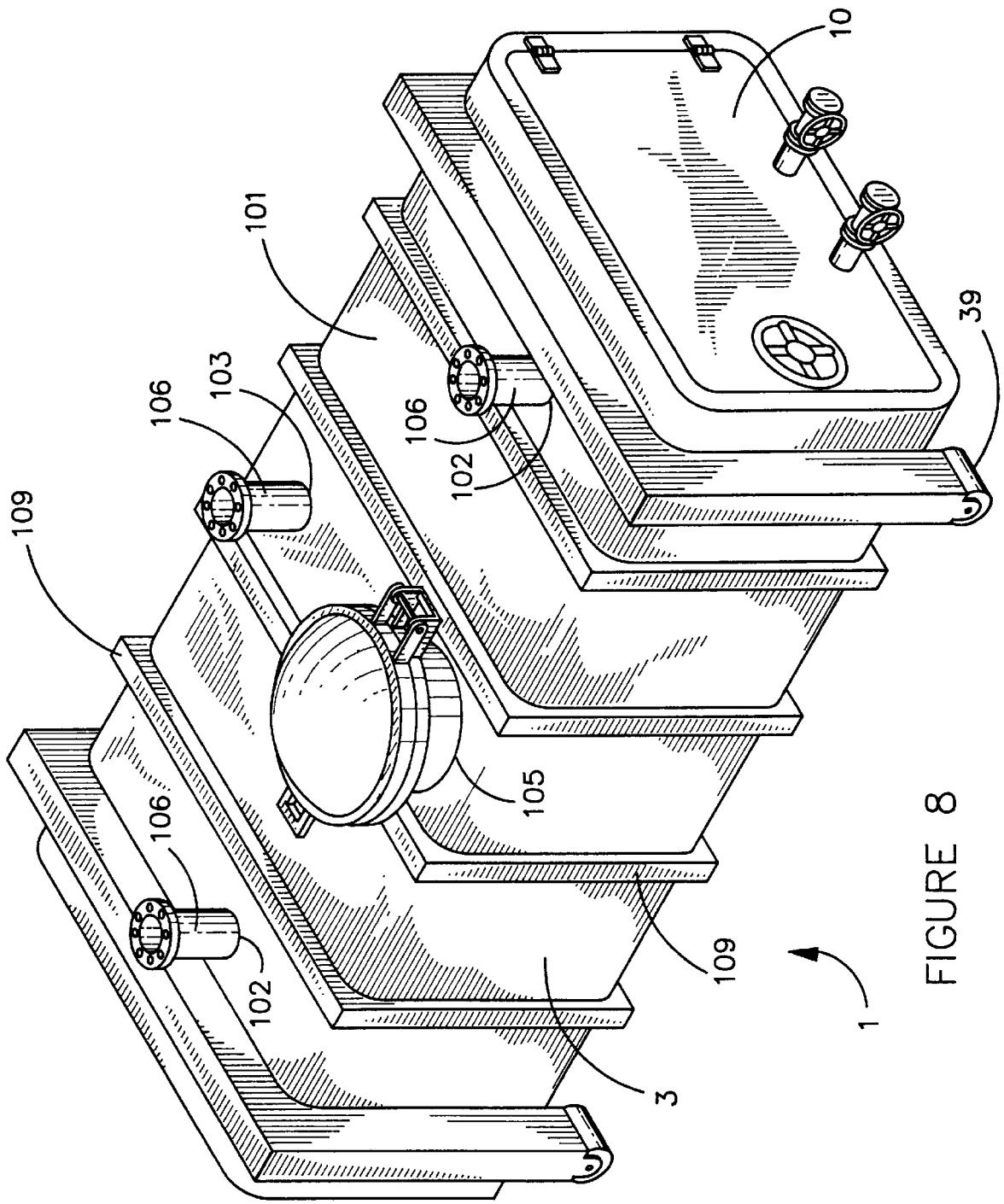
FIG. 8 is a perspective view of a preferred embodiment of a vacuum loadable separator.
Figure 9:
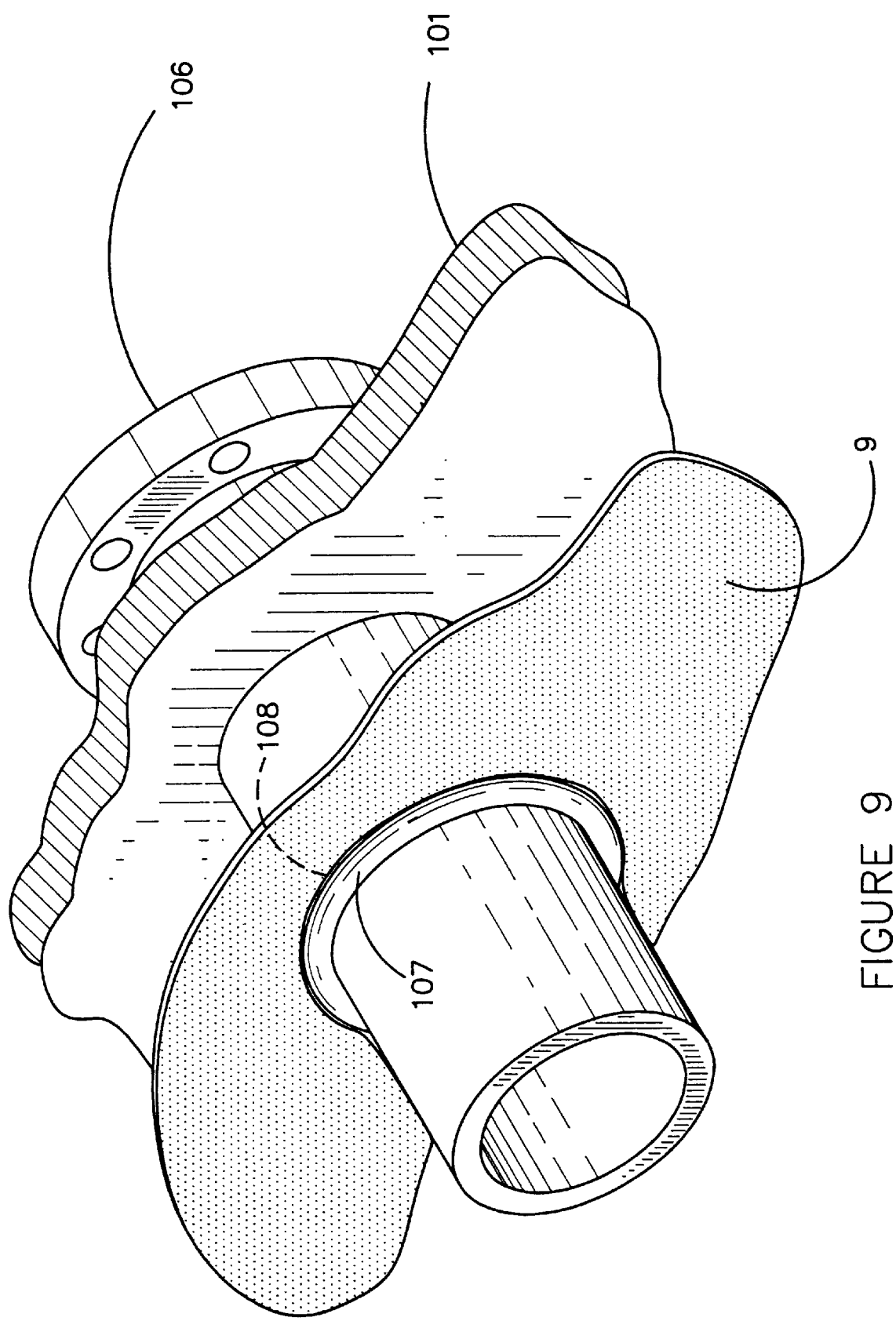
FIG. 9 is a cut-away, perspective view of the filter installed over a pipe section.

The invention is a tank 1 for the separation of targeted solids from liquid in sludge. Sludge is intended to include all liquid-solid mixtures regardless of the particle size of the solid, composition of the liquid or percentage of liquid in the mixture. Tank 1 has bed 2 and walls 3 surrounding bed 2. The surfaces 4 of bed 2 and walls 3 form a sludge receiving cavity 5.

To facilitate removal of deliquified targeted solids, a target solids opening 6 is provided in tank 1. Target solids opening 6 may be an open top 7 to tank 1. Alternatively, it may be a gate formed in any of walls 3. Any one of walls 3 may also be wholly or partially removable. In one preferred embodiment, target solids opening 6 comprises using one of walls 3 as a door 10 by mounting one of walls 3 on a hinge. Door 10 should be equipped with a watertight seal 12 to prevent leaks.

A dividing wall 8 divides sludge receiving cavity 5. In a preferred embodiment, several dividing walls 8 are provided in tank 1, as shown in FIG. 2. Dividing wall 8 is positioned so that it is generally perpendicular to bed 2. In a preferred embodiment, dividing wall 8 should be substantially perpendicular to target solids opening 6. In another preferred embodiment shown in FIG. 1, dividing wall 8 should adjoin the surface 4 of either walls 3 or bed 2 that is opposite target solids opening 6. In a preferred embodiment, dividing wall 8 will be sized and fixed to approximately longitudinally center the upper edge 43 of dividing wall 8 in sludge receiving cavity 5. In a preferred embodiment, dividing wall 8 should be approximately the length of sludge receiving cavity 5. In another preferred embodiment, upper edge 43 of dividing wall 8 is a continuous smooth surface. This can be accomplished by attaching a pipe 31, a square tubing or conduit, to upper edge 43. Alternatively, dividing wall 8 may be finished so that upper edge 43 is smooth.

A liquid filter 9 is positioned in sludge receiving cavity 5 so that filter 9 drapes over dividing wall 8. Filter 9 may be attached to tank 1 by suspension hooks or clips which are attached to walls 3 or to first support means 14. In a preferred embodiment, a mounting plate 38 is attached to the top edge of first support means 14. The edges of filter 9 are hooked to suspension hooks or clips. Filter 9 is then draped over mounting plate 38 so that the weight of filter 9 is distributed across mounting plate 38. In another preferred embodiment, the edges of filter 9 extend substantially beyond the tops of walls 3 so that filter 9 is held in position over sludge receiving cavity 5 by gravity and the weight of the sludge as it is deposited into tank 1.

The material and mesh size of filter 9 are chosen to retain the target solids in the particular sludge being handled while allowing liquids in the sludge to pass through. Important design considerations are the corrosiveness, solvent strength, particle size and separation criteria for a sludge. Another consideration for filter 9 is that it be suitable to employ capillary action to wick up the liquid from the sludge. Examples of suitable filter media are: paper, cotton, nylon and other organic polymers, metal mesh and fiberglass. Those with skill in the art may choose from a variety of fibrous filters on the market to meet the aforementioned design criteria. It is believed that filters containing cotton will be suitable to wick aqueous liquids while filters containing organic polymers, such as polypropylene, will be able to wick organic liquids. Wicking action is particularly helpful with sludges containing fines which do not drain well and wherein the liquid tends to pool on top of the sludge.

Once the liquid has passed through filter 9, there must be a space around filter 9 to allow the liquid to flow. The size of the space will affect the volume of liquid that can flow per unit of time. However, for there to be flow at some rate, there must only be a minuscule space. First support means 14 provide this first free flow space 15.

In one preferred embodiment, first support means 14 comprises a grating 16 having grating openings 17 which is mounted over bed 2 and walls 3. A screening 18 is laid over grating 16. Filter 9 rests over screening 18. Grating 16 and screening 18 separate filter 9 from bed 2 and walls 3, providing first free flow space 15. The primary purpose of screening 18 is to prevent filter 9 from extending substantially into grating openings 17. In a more preferred embodiment, screening 18 should contain no rough edges that face the interior of sludge receiving cavity 5, in order to avoid tearing screening 18 or filter 9 as filter 9 is removed from tank 1. In another preferred embodiment, screening 18 has four to six openings per linear inch and is made of stainless or galvanized steel or plastic or fiberglass. If grating openings 17 are sufficiently small, screening 18 need not be used. In another preferred embodiment, grating 16 should be made of a strong corrosion resistant material such as stainless or galvanized steel or plastic or fiberglass.

In an alternate preferred embodiment, first support means 14 comprises a heavy coarse screening (not shown) mounted over bed 2 and walls 3. Filter 9 rests over coarse screening, to provide first free flow space 15. If necessary, screening 18 may be used in conjunction with coarse screening. In a more preferred embodiment, coarse screening should be a strong corrosion resistant material such as stainless or galvanized steel or plastic or fiberglass.

In another alternative preferred embodiment, first support means 14 comprises corrugated sheets 41 mounted over bed 2 and walls 3. Filter 9 rests over corrugated sheets 41, to provide first free flow space 15. If necessary, screening 18 may be used in conjunction with corrugated sheets 41. In a more preferred embodiment, corrugated sheets should be a strong corrosion resistant material such as stainless or galvanized steel or plastic or fiberglass.

In another alternative preferred embodiment, first support means 14 comprises a fencing 42 having fencing openings 43. Fencing 42 is mounted over bed 2 and walls 3. Filter 9 rests over fencing 42 to provide first free flow space 15. If necessary, screening 18 may be used in conjunction with fencing 42. In a more preferred embodiment, fencing 42 should be made of a strong corrosion resistant material such as stainless or galvanized steel or plastic or fiberglass.

In another alternative preferred embodiment, first support means 14 comprises perforated sheets (not shown) having perforation openings 23. Perforated sheets are mounted over bed 2 and walls 3. Filter 9 rests over perforated sheets to provide first free flow space 15. If necessary, screening 18 may be used in conjunction with perforated sheets. In a more preferred embodiment, perforated sheets are comprised of strong corrosion resistant material such as stainless or galvanized steel or plastic or fiberglass.

In another alternative preferred embodiment, first support means 14 comprises a series of spaced bars (not shown) lining bed 2 and walls 3. Filter 9 rests over spaced bars to provide first free flow space 15. If necessary, screening 18 may be used in conjunction with spaced bars. In a more preferred embodiment, spaced bars should be made of a strong corrosion resistant material such as stainless or galvanized steel or plastic or fiberglass.

In order for dividing wall 8 to provide an effective drainage surface, a second free flow space 25 should be provided between filter 9 and dividing wall 8. Second free flow space 25 may be provided by second support means 26. Dividing wall 8 can be composed of either second support means 26, or second support means 26 can be mounted over dividing wall 8.

Preferred embodiments of second support means 26 include grating 16, coarse screening, corrugated sheets 41, fencing 42, perforated sheets, and spaced bars. All may be used in conjunction with screening 18, if necessary. In a more preferred embodiment, second support means 26 is made of a strong corrosion resistant material such as stainless or galvanized steel or plastic or fiberglass.

In another preferred embodiment, first support means 14 and second support means 26 and screening 18, if desired, may be combined into a basket (not shown). The basket may be composed of grating 16, coarse grating, corrugated sheets, fencing, perforated sheets, or spaced bars. In a more preferred embodiment, the basket is made of a strong corrosion resistant material such as stainless or galvanized steel or plastic or fiberglass. The basket may be removable from tank 1.

Liquid that enters first free flow space 15 should be removed for separation to continue. This is accomplished through first liquid removal means 27. Preferred embodiments of first liquid removal means 27 include a drain 28 in the bottom of any one of walls 3 or in bed 2 connecting first free flow space 15 to the exterior of tank 1, or a conventional pump, siphon or vacuum line (not shown) connecting first free flow space 15 to the exterior of tank 1. In another preferred embodiment, drain 28 should be located at or below the level of bed 2.

Liquid that enters second free flow space 25 should also be removed for separation to continue. This is accomplished through second liquid removal means. Preferred embodiments of second liquid removal means include drain 28, or a conventional pump, siphon or vacuum line.

Second free flow space 25 and first free flow space 15 may be fluidly connected so that a single drain 28 performs the functions of both first liquid removal means 27 and second liquid removal means. In a preferred embodiment, shown in FIG. 1, second free flow space 25 drains into first free flow space 15. Liquid in first free flow space is then removed from tank 1 through drain 28, pump line or siphon line. As liquid flows or is pumped out of either first or second liquid removal means, it may be collected in an appropriate container.

In a preferred embodiment of the invention, dividing wall 8 is provided with a pipe 31. In this preferred embodiment, pipe 31 contains a central passageway 32. Pipe 31 is substantially parallel to dividing wall 8. Pipe 31 is fitted to receive compressed gas from a compressed gas source. In a preferred embodiment, compressed gas source is an air compressor. In this preferred embodiment, pipe 31 contains at least one air hole 35 connecting central passageway 32 to sludge receiving cavity 5. In a preferred embodiment, air holes 35 are located in the upper half of pipe 31. In another preferred embodiment, air holes 35 are located in the upper quartile of pipe 31. By introducing compressed gas into sludge receiving cavity 5 through pipe 31, central passageway 32 and air holes 35 sludge in tank 1 may be deliquified more rapidly. In a preferred embodiment, compressed gas may be steam, provided the material for filter 9 is chosen to withstand the heat. In a preferred embodiment, pipe 31 has a removable cap which when removed provides access to central passageway 32 so that central passageway 32 may be readily cleaned. In a preferred embodiment, pipe 31 should be composed of a strong corrosion resistant material such as stainless or galvanized steel or plastic or fiberglass.

In operation, sludge is deposited in tank 1 over filter 9. Liquid in the sludge drains through filter 9 via gravity, hydrostatic pressure, and capillary action. Filter 9 will wick the liquid to first free flow space 15 and to second free flow space 25. The liquid will run down both free flow spaces 15 and 25. In a preferred embodiment, both free flow spaces 15 and 25 are connected so that liquid will collect over bed 2. The liquid may be removed from tank 1 via drain 28. In a preferred embodiment, tank 1 may be angled toward drain 28 to enhance drainage.

In a preferred embodiment, tank 1 may be vacuum loadable. In this embodiment, tank 1 should be provided with a closed top 101. Closed top 101 will be provided with at least two ports, 102 and 103. First port 102 will generally be attached to a loading hose which will draw from the sludge that is to be loaded into tank 1. Second port 102 will be attached to a vacuum source such as a vacuum truck or other similar source. By pulling a vacuum through tank 1, sludge may be loaded into tank 1 via first port 102 and the loading hose. A vacuum strength of 15–28 inches of mercury should be sufficient to load most sludges.

More than two ports may be desired to ensure that tank 1 may be easily loaded from any direction and to allow for uniform filling of tank 1. In a preferred embodiment, ports 102 and 103 have an 8 inch diameter. An additional, larger inspection port 105 may be desired to allow worker access to the interior of tank 1 while target solids removal opening 6 is closed.

When closed top 101 is used to facilitate vacuum filling of tank 1, care should be taken to ensure that filter 9 remains in place and that sludge does not end up behind filter 9 in first free flow space 15. A preferred way to do this is to provide a filter 9 that covers the entire sludge receiving cavity 5 including the inside surface of closed top 101. In a preferred embodiment, filter 9 may be suspended from hooks 110 which may be positioned in the upper corners of closed top 101. Of course, filter 9 will have to contain apertures to allow for the introduction of sludge into sludge receiving cavity 5. Pipe sections 106 may be provided in ports 102 and 103 to allow for passage through filter 9. In this preferred embodiment, pipe sections 106 are provided with shoulders 107. Filter 9 may be attached to pipe sections 106 by using constrictors 108 such as elastic bands or cable ties to secure filter 17 to pipe sections 106 above shoulders 107. The vacuum may then be pulled through second aperture 103 which will draw sludge through first aperture 102 and into sludge receiving cavity 5.

Once the sludge has been loaded into tank 1, the separation process is the same in the vacuum loaded embodiment of tank 1 as in the non-vacuum loaded embodiment. The vacuum loaded tank 1 is constructed in substantially the same fashion as the non-vacuum loadable tank 1 except for closed top 101 and its ports 102 and 103. One other significant difference arises from the fact that vacuum loaded tank 1 must withstand strong vacuums. To that end, the exterior surface of walls 3, top 101 and bed 2 may be reinforced with ribs 109 or otherwise strengthened.

One operating tank 1 may wish to treat the sludge with a chemical coagulant. These are frequently polymers which can be obtained commercially from Callaway Chemical, American Cyanamid and Nalco, among others. The purpose of the coagulant is to cause the sludge to clump together or coagulate. This will force the liquids away from the solids, allowing them to drain more quickly. The coagulation will also trap many of the fine particles contained in the sludge in the clumps. This will help reduce blinding.

Dividing wall 8 provides enhanced drainage for the middle of tank 1 by increasing the surface area available for drainage in tank 1 and simultaneously decreasing the distance liquid in the middle of tank 1 has to travel to reach a drainage surface without substantially altering the volume of tank 1. Liquid that tended to become trapped in the center of tank 1 because of its distance from the drainage surfaces can exit tank 1 through the portion of filter 9 overlaying dividing wall 8.

In a preferred embodiment, tank 1 is mounted on rollers 39. After the sludge is sufficiently dry, tank 1 may be rolled onto a flat-bed truck or trailer or other transportation device. In a preferred embodiment, the exterior of tank 1 is provided with at least one hook to assist in winching tank 1 onto a transportation device.

Once loaded onto the transportation device, tank 1 will be transported to either a disposal site or to a site for further treatment if it is waste material. If the retained solids are a product in a manufacturing process, they may be retrieved and used. In either case, target solids removal opening 6 will be opened and the deliquified target solids and filter 9 will be removed from tank 1. After a cleaning and installation of a new filter 9, tank 1 will be ready for use again.

In an alternative embodiment, tank 1 may be provided with handles to facilitate emptying. Handles can engage the dumping mechanism of a receptacle vehicle such as those used for garbage collection. Such an embodiment would be most useful when target solids removal opening 6 comprises open top 7. It is noted that when tank 1 has open top 7, one operating tank 1 may wish to cover open top 7 when tank 1 is exposed to the elements to prevent rainfall from interfering with the drying of the sludge.

Blinding may be reduced through a method of operating tank 1. First and second liquid removal means should be closed when sludge is deposited into sludge receiving cavity 5. After first free flow space 15 and second free flow space 25 have filled with liquid, further flow through filter 9 will be prevented. Thus, the liquid in the sludge will stagnate, allowing the solids to settle out. This may, depending on the initial consistency of the sludge, result in the formation of two phases in the sludge: a relatively solid free fluid phase and a remaining sludge phase. When relatively solid free fluid phase has formed, first and second liquid removal means may be opened. Because the liquid that comprises relatively solid free fluid phase contains little interstitial matter relative to the remaining sludge phase, it will drain off before the liquid that is still trapped in the remaining sludge phase. Blinding will be minimized because many of the finer solids that were the root of the problem will have settled into the remaining sludge phase or will lie immediately above the remaining sludge phase. The liquid flow out of the remaining sludge phase will be slow enough to prevent substantial blinding there. Any blinding that does occur in the filter area above the remaining sludge will be inconsequential because no further filtration will be performed in that part of tank 1.

There are, of course, many alternate embodiments which are intended to be included within the scope of the following claims.

I claim:

1. A liquid-solid separator for separating liquids from target solids in a sludge comprising:
    a tank comprising a bed and a plurality of walls extending upwardly from said bed, said bed and said walls defining a sludge receiving cavity;
    a dividing wall, substantially perpendicular to said bed, positioned within said sludge receiving cavity; and
    a liquid permeable filter mounted within said sludge receiving cavity and overlying said bed, said walls, and said dividing wall, said bed, said walls and said dividing wall configured to permit flow of liquid from within said cavity through said filter to at least one drain configured to allow the discharge of liquid from said sludge receiving cavity.

2. A separator according to claim 1 wherein said tank is provided with a plurality of dividing walls.

3. A separator according to claim 1 wherein said tank contains a target solids removal opening.

4. A separator according to claim 3 wherein said dividing wall is positioned substantially perpendicularly to said target solids opening.

5. A separator according to claim 3 wherein said dividing wall is connected to one of said walls opposite said target solids removal opening.

6. A separator according to claim 1 wherein said sludge receiving cavity contains a grating having grating openings, said grating mounted over at least a portion of said bed and said walls.

7. A separator according to claim 6 wherein said filter is mounted over said grating, whereby said grating creates a space between said filter and said bed and between said filter and said walls, thereby allowing liquid to flow through said filter.

8. A separator according to claim 6 further comprising a screening positioned over said grating.

9. A separator according to claim 8 wherein said filter is mounted over said screening, whereby said grating and said screening create a space between said filter and said bed and between said filter and said walls, thereby allowing liquid to flow through said filter.

10. A separator according to claim 1 wherein said sludge receiving cavity contains a plurality of perforated sheets, said sheets mounted over at least a portion of said bed and said walls.

11. A separator according to claim 10 wherein said filter is mounted over said sheets, whereby said sheets create a space between said filter and said bed and between said filter and said walls, thereby allowing liquid to flow through said filter.

12. A separator according to claim 1 wherein said dividing wall is comprised of grating.

13. A separator according to claim 12 wherein said filter is mounted over said grating, whereby said grating creates a space adjacent to said filter, thereby allowing liquid to flow through said filter.

14. A separator according to claim 12 further comprising a screening overlying said dividing wall.

15. A separator according to claim 14 wherein said filter is mounted over said screening, whereby said grating and said screening create a space adjacent to said filter, thereby allowing liquid to flow through said filter.

16. A separator according to claim 1 wherein said dividing wall is comprised of at least one perforated sheet.

17. A separator according to claim 16 further comprising a screening overlying said dividing wall.

18. A separator according to claim 17 wherein said filter is mounted over said perforated sheet, whereby said sheet and said screening create a space adjacent to said filter, thereby allowing liquid to flow through said filter.

19. A liquid-solid separator for separating liquids from target solids in a sludge comprising:
   a tank comprising a bed and a plurality of walls extending upwardly from said bed, said bed and said walls defining a sludge receiving cavity;
   a dividing wall positioned within said sludge receiving cavity and substantially perpendicularly to said bed; and
   a liquid permeable filter mounted within said sludge receiving cavity and overlying said dividing wall, said dividing wall configured to permit flow of liquid from within said cavity through said filter overlying said dividing wall to at least one drain configured to allow the discharge of liquid from said sludge receiving cavity.

20. A separator according to claim 19 wherein said tank is provided with a plurality of dividing walls.

21. A separator according to claim 19 wherein said tank contains a target solids removal opening.

22. A separator according to claim 21 wherein said dividing wall is positioned substantially perpendicularly to said target solids opening.

23. A separator according to claim 21 wherein said dividing wall is connected to one of said walls opposite said target solids removal opening.

24. A separator according to claim 19 wherein said dividing wall is comprised of grating.

25. A separator according to claim 24 wherein said filter is mounted over said grating, whereby said grating creates a space adjacent to said filter, thereby allowing liquid to flow through said filter.

26. A separator according to claim 24 further comprising a screening overlying said dividing wall.

27. A separator according to claim 26 wherein said filter is mounted over said screening, whereby said grating and said screening create a space adjacent to said filter, thereby allowing liquid to flow through said filter.

28. A separator according to claim 19 wherein said dividing wall is comprised of at least one perforated sheet.

29. A separator according to claim 28 further comprising a screening overlying said dividing wall.

30. A separator according to claim 29 wherein said filter is mounted over said screening, whereby said sheet and said screening create a space adjacent to said filter, thereby allowing liquid to flow through said filter.

31. A separator according to claims 1, 2, 7, 9, 11, 13, 15, 18, 19, 20, 25, 27 or 30 wherein said separator is vacuum loadable.

* * * * *